US008458878B1

(12) United States Patent
Kunz

(10) Patent No.: US 8,458,878 B1
(45) Date of Patent: Jun. 11, 2013

(54) COIL SPRING MOUNTING SYSTEM AND METHOD FOR USE IN A TILT-IN WINDOW COUNTERBALANCE ASSEMBLY

(76) Inventor: John R. Kunz, Douglassville, PA (US)

( * ) Notice: Subject to any disclaimer, the term of this patent is extended or adjusted under 35 U.S.C. 154(b) by 329 days.

(21) Appl. No.: 12/942,998

(22) Filed: Nov. 9, 2010

(51) Int. Cl.
*B23P 17/00* (2006.01)
*E05D 15/16* (2006.01)

(52) U.S. Cl.
USPC .................. 29/413; 29/423; 49/447; 49/506; 16/197

(58) Field of Classification Search
USPC ............. 29/413–415, 423, 436; 49/506, 445, 49/447; 16/197
See application file for complete search history.

(56) References Cited

U.S. PATENT DOCUMENTS

| | | | | | |
|---|---|---|---|---|---|
| 517,808 | A * | 4/1894 | Sterner, Jr. | ...................... | 264/33 |
| 5,210,976 | A * | 5/1993 | Cripps | ............................ | 49/181 |
| 5,365,638 | A * | 11/1994 | Braid et al. | ...................... | 16/197 |
| 5,520,311 | A * | 5/1996 | Lam | ............................... | 223/85 |
| 5,661,927 | A * | 9/1997 | Polowinczak et al. | .......... | 49/447 |
| 6,378,169 | B1 * | 4/2002 | Batten et al. | .................... | 16/197 |
| 6,584,644 | B2 | 7/2003 | Braid et al. | | |
| 6,857,228 | B2 * | 2/2005 | Kunz et al. | ...................... | 49/181 |
| 6,983,513 | B2 * | 1/2006 | Pettit | ............................... | 16/197 |
| 7,676,989 | B2 * | 3/2010 | Braid et al. | ..................... | 49/447 |
| 7,735,191 | B2 * | 6/2010 | Tuller | ............................. | 16/193 |
| 2005/0198775 | A1 * | 9/2005 | Pettit et al. | ...................... | 16/197 |

* cited by examiner

*Primary Examiner* — David Bryant
*Assistant Examiner* — Justin Sikorski
(74) *Attorney, Agent, or Firm* — LaMorte & Associates, P.C.

(57) ABSTRACT

A system and method for mounting a coil spring to a brake shoe in a guide track of a window frame. A brake shoe and coil spring are provided. A housing is provided to hold the coil spring. A stop mount is also provided for limiting the movement of the housing in the guide track. The housing and the stop mount are temporarily joined into a common assembly. The coil spring is placed in the housing. The stop mount is mounted in the guide track at a fixed position, wherein the housing is positioned above the stop mount. The free end of the coil spring is connected to the brake shoe below the stop mount The stop mount is then detached from the housing. This enables the housing to move freely within the guide track independently of the stop mount.

17 Claims, 4 Drawing Sheets

COIL SPRING MOUNTING SYSTEM AND METHOD FOR USE IN A TILT-IN WINDOW COUNTERBALANCE ASSEMBLY

BACKGROUND OF THE INVENTION

1. Field of the Invention

In general, the present invention relates to counterbalance systems for windows that use coil springs to prevent open window sashes from moving under the force of their own weight. More particularly, the present invention system relates to systems and methods used to anchor a coil spring in the guide track of a tilt-in window.

2. Description of the Prior Art

There are many types and styles of windows. One of the most common types of windows is the double-hung window. Double-hung windows are the window of choice for most home construction. A double-hung window consists of an upper window sash and a lower window sash. Either the upper window sash or the lower window sash can be selectively opened and closed by a person sliding the sash up and down within the window frame.

A popular variation of the double-hung window is the tilt-in, double-hung window. Tilt-in, double-hung windows have sashes that can be selectively moved up and down. Additionally, the sashes can be selectively tilted into the home so that the exterior of the sashes can be cleaned from within the home.

The sash of a double-hung window has a weight that depends upon the materials used to make the window sash and the size of the window sash. Since the sashes of a double-hung window are free to move up and down within the frame of a window, some counterbalancing system must be used to prevent the window sashes from always moving to the bottom of the window frame under the force of their own weight.

For many years, counterbalance weights were hung next to the window frame in weight wells. The weights were attached to the window sash using a string or chain that passed over a pulley at the top of the window frame. The weights counterbalanced the weight of the window sashes. As such, when the sashes were moved in the window frame, they had a neutral weight and friction would hold them in place.

The use of weight wells, however, prevents insulation from being packed tightly around a window frame. Furthermore, the use of counterbalance weights on chains or strings cannot be adapted well to tilt-in, double-hung windows. Accordingly, as tilt-in windows were being designed, alternative counterbalance systems were developed that were contained within the confines of the window frame and did not interfere with the tilt action of the tilt-in windows.

Modern tilt-in, double-hung windows are primarily manufactured in one of two ways. There are vinyl frame windows and wooden frame windows. In the window manufacturing industry, different types of counterbalance systems are traditionally used for vinyl frame windows and for wooden frame windows. The present invention is mainly concerned with the structure of vinyl frame windows. As such, the prior art concerning vinyl frame windows is herein addressed.

Vinyl frame, tilt-in, double-hung windows are typically manufactured with guide tracks along the inside of the window frame. Brake shoe assemblies, commonly known as "shoes" in the window industry, are placed in the guide tracks and ride up and down within the guide tracks. The shoes are connected to coil springs that provide the counterbalance force. The coil springs are anchored to the guide tracks so that the coil springs unwind and rewind as the window sash moves up and down.

Coil springs are coiled ribbons of spring steel that have a free end. The coil springs resist the unwinding of the coiled ribbon and the separation of the free end of the spring from the remaining coiled body. In certain models of tilt-in windows, the wound body of the coil spring is mounted in a fixed position in the guide track of the window. The free end of the coil spring is connected to the brake shoe. In this manner, the coil spring resists any movement of the brake shoe away from the body of the coil spring. The coil spring is often held in a housing, wherein the housing is connected with mounting screws to the guide track. Often, a mounting screw passes through the center of the coil spring and acts as the pivot around which the coil spring rotates. If the mounting screw loosens or otherwise breaks free, the coil spring falls out of place and the window assembly must be repaired. Accordingly, strong well-set mounting screws are typically used. However, if a mounting screw is over-tightened, it may hamper the ability of the coil spring to rewind. This is especially true with certain models of tilt-in windows that have uneven surfaces within the guide track. If a mounting screw is over-tightened, it causes the housing to conform to the uneven surface of the guide track surface to which it is attached. This warps the housing and causes contact friction that inhibits the coil spring. Such prior art spring mounting assemblies are exemplified by U.S. Pat. No. 6,584,644 to Braid, entitled Spring Mounting For Sash Window Tensioning Arrangements.

When a person lifts a window sash to its open position, the ribbons of the coil springs rewind. The coil spring must be able to rewind in the short period of time that it takes to lift open the window sash. If the ability of a coil spring to rewind is hampered, the rewind rate of that coil spring may be longer than it takes to lift open a window sash. When this occurs, the ribbon of the coil spring is compressed between the slowly rewinding coil and the upwardly advancing sash. This causes the ribbon of the coil spring to snake and bend. It also prevents the window sash from opening. If the sash is forced open, the ribbon may kink. The ribbon will then never properly rewind and the window must be repaired before it will again work properly.

A need therefore exists for a coil spring mounting system that anchors a coil spring in place, yet cannot restrict the ability of the coil spring to both unwind and rewind. This need is met by the present invention as described and claimed below.

SUMMARY OF THE INVENTION

The present invention is a system and method for mounting a coil spring to a brake shoe in a guide track of a window frame. A standard brake shoe and coil spring are provided. A housing is provided to hold the coil spring. A stop mount is also provided for limiting the movement of the housing in the guide track. The housing and the stop mount are temporarily joined into a common assembly for the purposes of installation. The coil spring is placed in the housing. The stop mount is mounted in the guide track at a fixed position, wherein the housing is positioned above the stop mount in said guide track. The brake shoe is positioned in the guide track below the stop mount. The free end of the coil spring is connected to the brake shoe by extending it past the stop mount within said guide track.

The stop mount is detached from the housing. This enables the housing to move freely within the guide track independently of the stop mount. Accordingly, the housing and coil spring are held above the stop mount yet are unrestrained by any fastener that may impede the ability of the coil spring to unwind and rewind.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention coil spring mounting system can be adapted for use in many window designs that use coil springs, the present invention system is especially well suited for use in tilt-in double-hung windows. Accordingly, the present invention coil spring mounting system is illustrated and described as being part of a tilt-in double-hung window application. However, it will be understood that the illustrated embodiments are merely exemplary of some of the best modes contemplated for the invention and that the exemplary embodiments are not intended to limit the scope of the claims.

Figure 1:
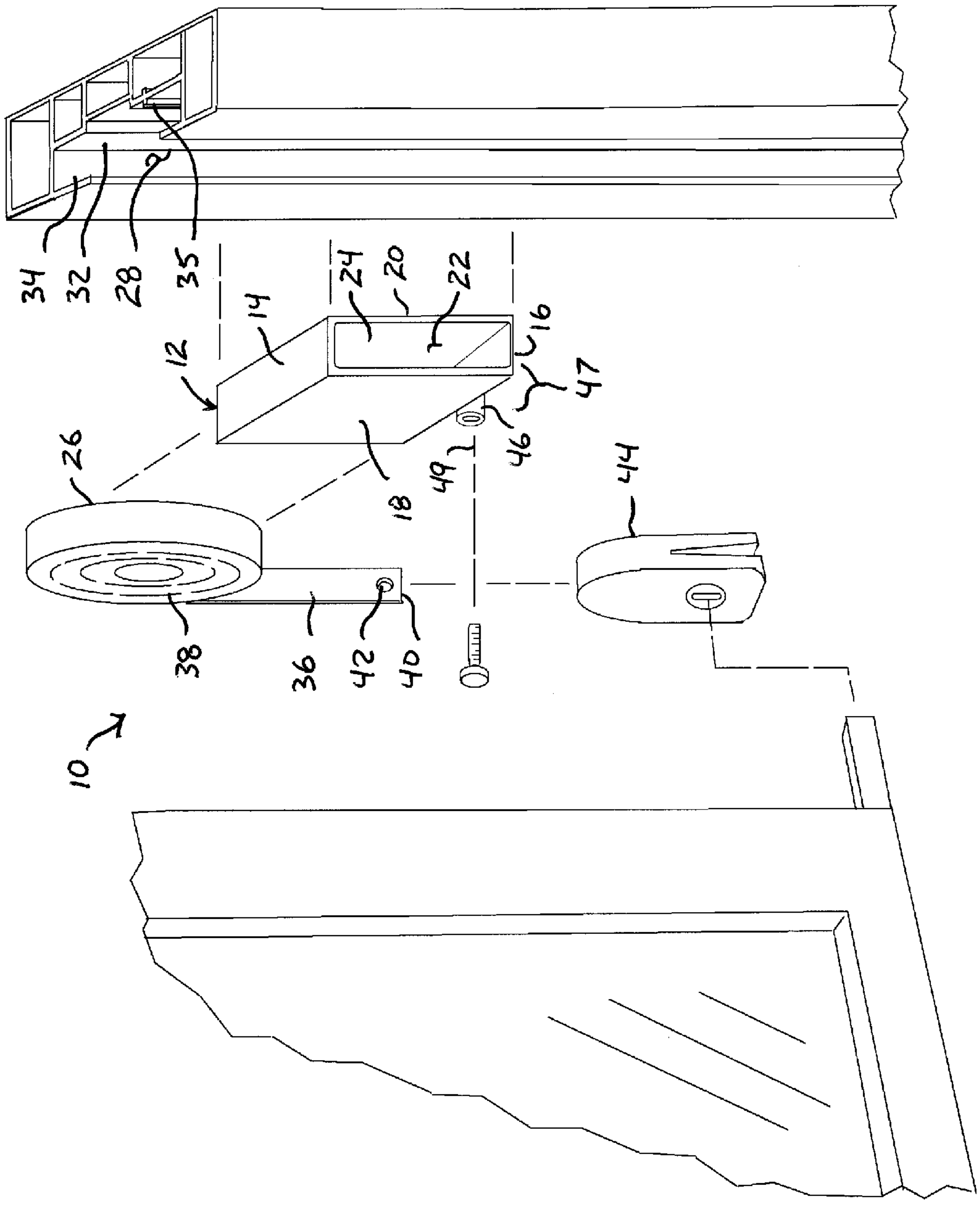
FIG. 1 is an exploded view of a counterbalance system in a tilt-in window assembly in accordance with the present invention.

Referring to FIG. 1, an exemplary embodiment of the present invention coil spring mounting system 10 is shown. The coil mounting system 10 utilizes a plastic housing 12. The housing 12 has a top surface 14, a bottom surface 16, a face surface 18 and a back surface 20. The sides 22 of the housing 12 are open. The housing 12 has an open interior space 24 that is accessible through the open sides 22. The interior space 24 is dimensioned to receive at least one coil spring 26.

The exterior of the housing 12 has a depth and width that enables the housing 12 to fit into the guide track 28 of a traditional window frame of a tilt-in window. The guide track 28 is defined by a rear wall 32 and two side walls 34. Guide tracks 28 have slightly different shapes depending upon the manufacturer of the guide tracks 28. Often, reinforcement ribs 35 and other structures are molded into the rear wall 32 of the guide track 28, therein preventing the rear wall 32 of the guide track 28 from being smooth.

A coil spring 26 is provided. The coil spring 26 consists of a metal spring ribbon 36 wound into a coil body 38. The free end 40 of the coil spring 26 has a connector termination 42, such as a hook or a loop that enables the free end 40 of the coil spring 26 to attach to a brake shoe 44. The brake shoe 44 can be any brake shoe known in the art that attaches to the free end of a coil spring.

The coil body 38 of the coil spring 26 is placed within the open interior 24 defined by the housing 12. The free end 40 of the coil spring 26 extends out of the housing 12 through one of the open sides 22 of the housing 12. It will be understood that the free end 40 of the coil spring 26 will extend out of different sides 22 of the housing 12 depending upon whether the coil spring 26 is attached to the left side or right side of a window frame 30.

The housing 12 is a molded plastic structure. A short mounting tube 46 is connected to the bottom surface 16 of the housing 12 via a breakaway section 48. The housing 12, breakaway section 48 and mounting tube 46 are all molded together to form a single assembly 47.

Figure 4:
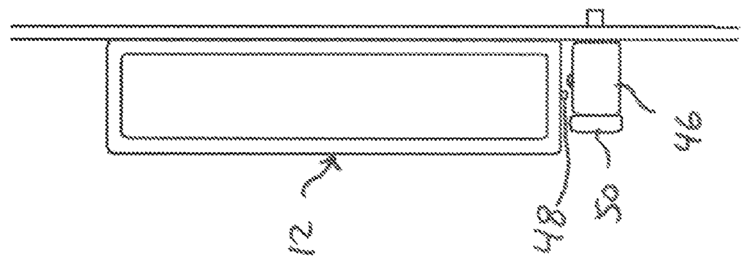
FIG. 4 is a side view of the assembly of FIG. 3 with the housing and stop mount severed by the action of a mounting screw.
Figure 3:
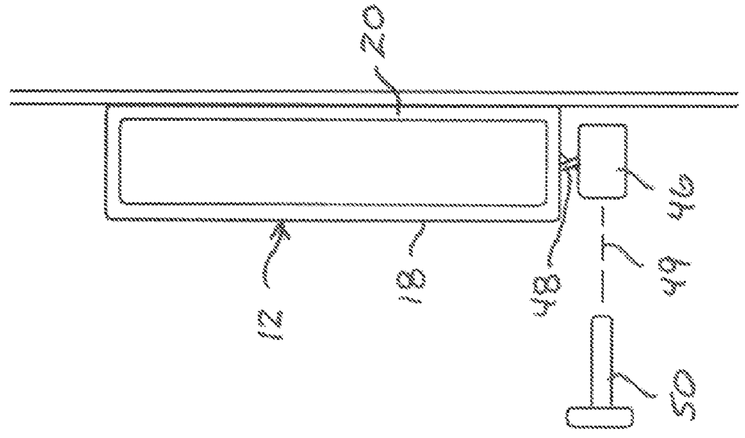
FIG. 3 is a side view of the assembly of FIG. 2 shown with the stop mount twisted.
Figure 2:
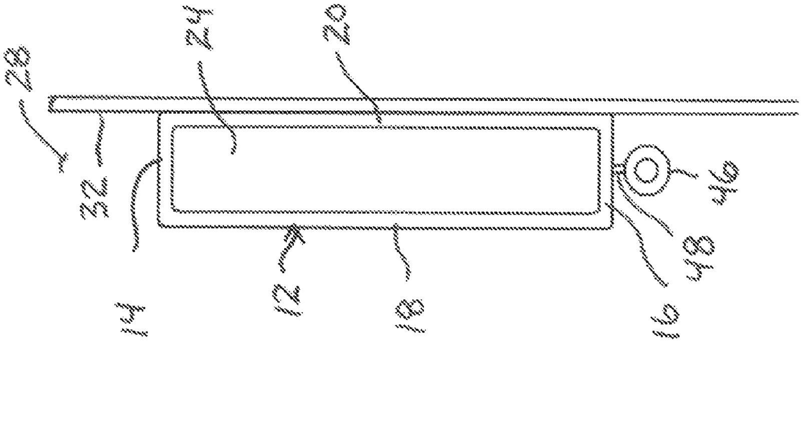
FIG. 2 is side view of the housing and stop mount as molded together as an assembly.

The mounting tube 46 has a length that is shorter than the width of the housing 12. Initially, the mounting tube 46 is oriented so that the longitudinal axis 49 of the mounting tube 46 is parallel to the face surface 18 and the back surface 20 of the housing 12. Referring now to FIGS. 2-4 in unison, it will be understood that to mount the housing 12 to the guide track 28, the mounting tube 46 is manually turned ninety degrees from its original orientation. Once turned, the longitudinal axis 49 of the mounting tube 46 is now perpendicular to the face surface 18 and the back surface 20 of the housing 12. See FIG. 3. The breakaway section 48 twists, but does not yet break as the mounting tube 46 is turned from its orientation in FIG. 2 to its orientation in FIG. 3.

Once turned, a mounting screw 50 is advanced through the mounting tube 46. The mounting screw 50 is then driven into the rear wall 32 of the guide track 28. See FIG. 4. As the mounting screw 50 is driven tight, the breakaway section 48 breaks and the mounting tube 46 becomes separate from the housing 12.

Figure 6:
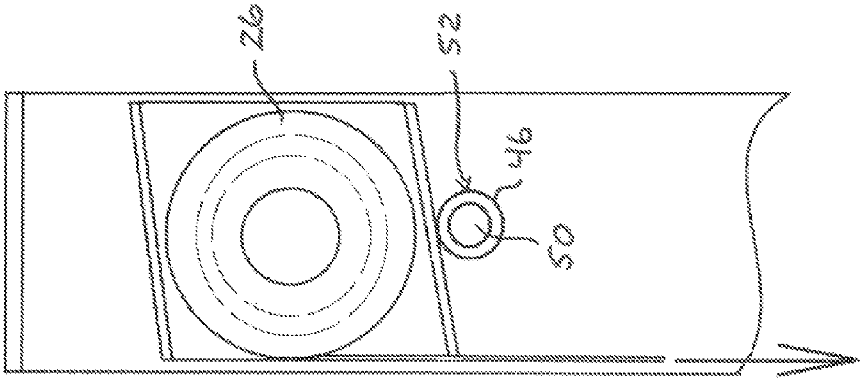
FIG. 6 is a segmented view showing a severed housing and stop mount in a guide track with a unwinding coil spring.
Figure 5:
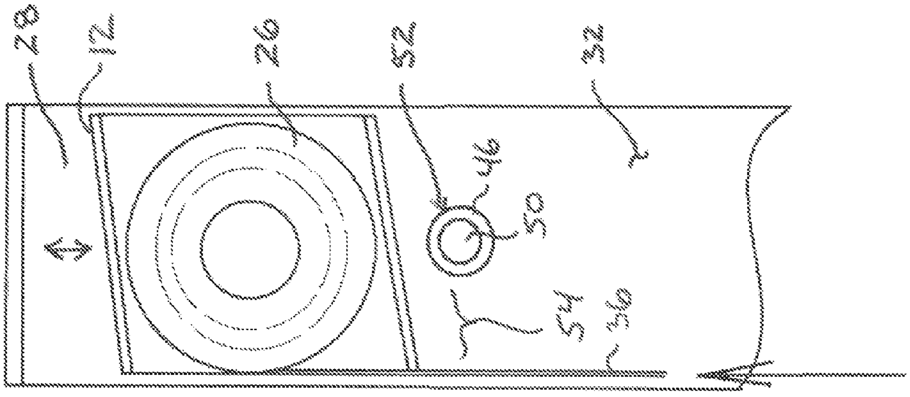
FIG. 5 is a segmented view showing a severed housing and stop mount in a guide track with a rewinding coil spring.

Referring now to FIG. 5 in conjunction with FIG. 6, it can be seen that the mounting tube 46 and the mounting screw 50 create a stop mount 52 in the center of the guide track 28 that prevents the housing 12 from moving past the stop mount 52 in the guide track 28. However, the housing 12 and the coil spring 26 are free to move in the guide track 28 above the stop mount 52. It will therefore be understood that the housing 12 and the coil spring 26 it holds are in no manner biased against the rear wall 32 of the guide track 28. Without any bias, the housing 12 remains in its true shape and does not hinder the unwinding or rewinding of the coil spring 26.

Although the stop mount 52 prevents the passage of the housing 12 and coil spring 26 in the guide track 28, the width of the stop mount 52 is much smaller than the width of the guide track 28. Consequently, open gaps 54 exist on either side of the stop mount 52 that enable the free end 40 (FIG. 1) and trailing ribbon 36 of the coil spring 26 to pass by the stop mount 52 without any restrictions.

Referring to FIGS. 1-6 in unison, it will be understood that in order to utilize the present invention coil spring mounting system 10, a coil spring 26 is placed inside the housing 12. The mounting tube 46 at the bottom of the housing 12 is turned ninety degrees, therein twisting and stressing the breakaway section 48 that holds the mounting tube 46 in place. The housing 12 is set at a desired location in the guide track 28 of a window frame 30. A mounting screw 50 is driven through the mounting tube 46 and into the guide track 28. The tightening of the mounting screw 50 breaks the breakaway section 48 and separates the housing 12 from the mounting tube 46.

The mounting screw 50 and surrounding mounting tube 46 create a stop mount 52 that prevents the housing 12 from descending below the stop mount 52 in the guide track 28. The free end 40 of the coil spring 26 is attached to a brake shoe 44 and the overall counterbalance system is ready to receive a window sash. When the window sash is lifted up, the coil spring 26 rewinds and is biased up and away from the stop mount 52. See FIG. 5. When the window sash is stationary or being closed, the housing 12 is biased against the stop mount 52 by the spring force of the coil spring 26. See FIG. 6.

Figure 7:
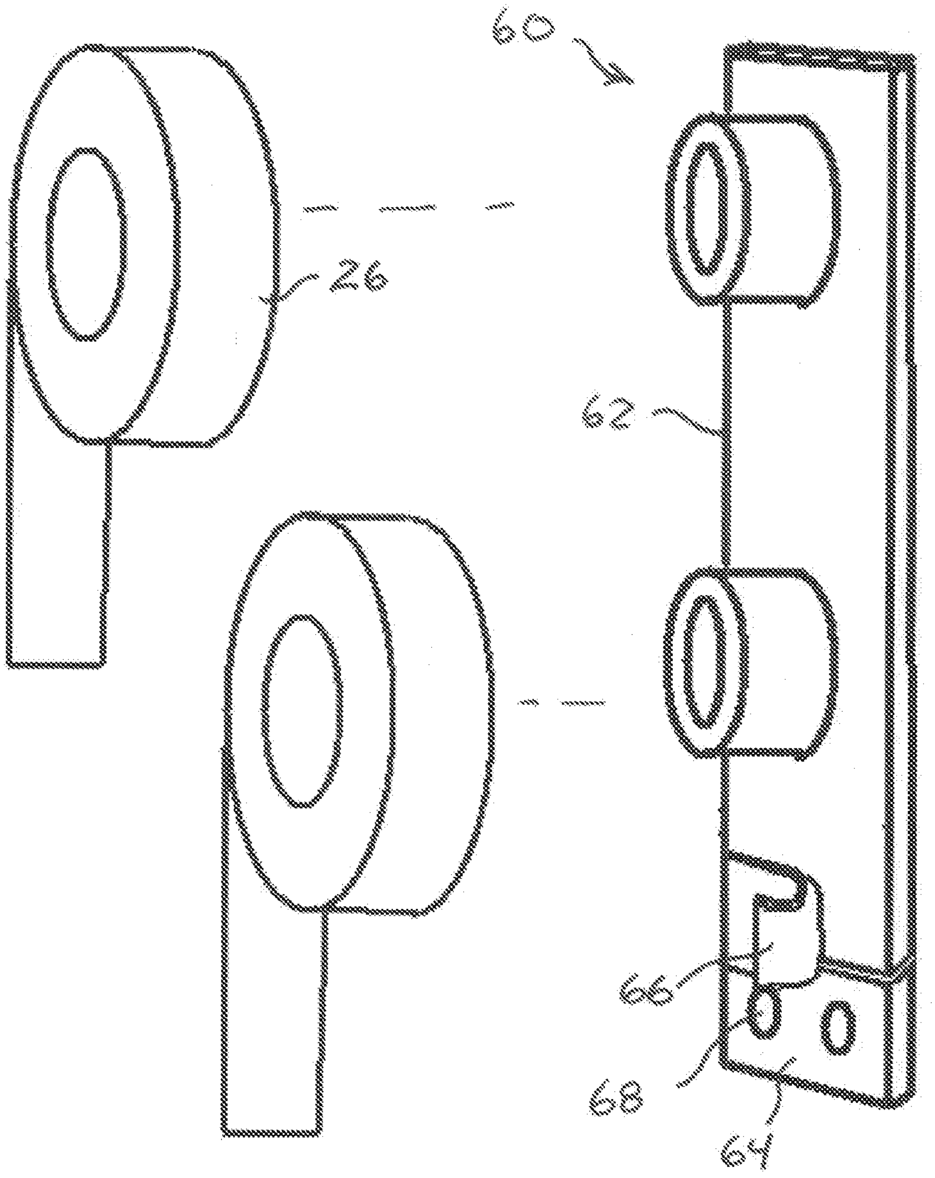
FIG. 7 is a perspective view of an alternate embodiment of a housing and stop mount joined in an assembly.

Referring now to FIG. 7, an alternate embodiment of the present invention coil spring mounting system 60 in shown. In this embodiment, a housing 62 is provided that holds more than one coil spring 26. The housing 62 engages the coil springs 26 through their centers. It should therefore be understood that the term "housing" as used in this specification is intended to include all structures capable of receiving a coil spring 26 without preventing the coil spring 26 from being able to both unwind and rewind.

A stop mount 64 is provided. The stop mount 64 is not molded as part of the housing 62, but is rather a separate part. The stop mount 64 and the housing 62 are temporarily joined together by a connector in the form of a peel-way label 66.

The stop mount 64 contains at least one screw hole 68. The stop mount 64 is anchored to the guide track 28 using one or more mounting screws. Once the stop mount 64 is anchored in place, the peel-away label 66 is removed and the housing 62 separates from the stop mount 64. The housing 62 is therefore free to move in the guide track 28 above the stop mount 64 but the housing 62 cannot pass below the stop mount 64.

It will be understood that the embodiments of the coil spring mounting system that are described and illustrated herein are merely exemplary and a person skilled in the art can make many variations to the embodiments shown without departing from the scope of the present invention. All such variations, modifications and alternate embodiments are intended to be included within the scope of the present invention as defined by the appended claims.

What is claimed is:

1. A method of mounting a coil spring to a brake shoe in a guide track of a window frame, said method comprising the steps of:

providing a brake shoe;

providing a coil spring having a free end;

providing a housing for holding said coil spring;

providing a stop mount;

temporarily joining said housing and said stop mount into a common assembly;

placing said coil spring into said housing;

mounting said stop mount in said guide track at a fixed position wherein said housing is positioned above said stop mount in said guide track;

positioning said brake shoe in said guide track below said stop mount; and connecting said free end of said coil spring to said brake shoe past said stop mount and within said guide track; and detaching said stop mount from said housing, wherein said housing is free to move in said guide track above said stop mount independently of said stop mount.

2. The method according to claim 1, wherein said step of temporarily joining said housing and said stop mount into a common assembly includes molding said housing and said stop mount together as a single piece, wherein said housing and said stop mount are joined by a breakaway section.

3. The assembly according to claim 2, wherein said stop mount is molded to said common assembly in a first orientation and said method includes manually manipulating said stop mount into a different second orientation before said stop mount is mounted to said guide track.

4. The assembly according to claim 3, wherein said step of manually manipulating said stop mount includes twisting said breakaway section between said stop mount and said housing.

5. The method according to claim 1, wherein said step of temporarily joining said housing and said stop mount into a common assembly includes interconnecting said housing and said stop mount with a removable connecting element.

6. The method according to claim 5, wherein said removable connecting element is an adhesive label.

7. The method according to claim 1, wherein said step of mounting said stop mount in said guide track includes driving at least one screw through said stop mount and into said guide track.

8. The method according to claim 7, wherein said step of driving at least one screw through said stop mount serves to automatically disconnect said stop mount from said housing.

9. A method of mounting a coil spring to a brake shoe in a guide track of a window frame, said method comprising the steps of:

providing a coil having a free end;

providing a brake shoe;

providing a common assembly containing a housing, for holding said coil spring, and a stop mount that are temporarily joined together;

placing said coil spring in said housing;

positioning said common assembly in said guide track, such that said coil spring and said housing are positioned above said stop mount;

disconnecting said stop mount from said housing, such that said housing is free to move in said guide track above said stop mount independently of said stop mount;

mounting said stop mount in said guide track at a fixed position;

positioning said brake shoe in said guide track below said stop mount; and attaching said free end of said coil spring to said brake shoe past said stop mount.

10. The method according to claim 9, wherein said step of providing a common assembly includes molding said housing and said stop mount together as a single piece, wherein said housing and said stop mount are joined together by a breakaway section.

11. The assembly according to claim 10, wherein said stop mount is molded to said common assembly in a first orientation and said method includes manually manipulating said stop mount into a different second orientation before said stop mount is mounted to said guide track.

12. The assembly according to claim 11, wherein said step of manually manipulating said stop mount includes twisting said breakaway section between said stop mount and said housing.

13. The method according to claim 9, wherein said step of providing a common assembly includes interconnecting said housing and said stop mount with a removable connecting element.

14. The method according to claim 13, wherein said removable connecting element is an adhesive label.

15. The method according to claim 13, wherein said step of mounting said stop mount in said guide track includes driving at least one screw through said stop mount and into said guide track.

16. The method according to claim 15, wherein said step of driving at least one screw through said stop mount serves to automatically disconnect said stop mount from said housing.

17. A method of mounting a coil spring to a brake shoe in a guide track of a window frame, said method comprising the steps of:

providing a coil spring having a free end;

providing a brake shoe;

providing a molded assembly having a housing and a stop mount that are joined by a breakaway section;

placing said coil spring in said housing of said molded assembly;

mounting said stop mount of said molded assembly in said guide track at a fixed position, therein positioning said coil spring and said housing in said guide track above said stop mount;

breaking said breakaway section to separate said housing from said stop mount, wherein said housing is free to move in said guide track above said stop mount independently of said stop mount;

positioning said brake shoe in said guide track below said stop mount; and attaching said free end of said coil spring to said brake shoe past said stop mount.

* * * * *